United States Patent
Song et al.

(10) Patent No.: US 7,187,933 B2
(45) Date of Patent: Mar. 6, 2007

(54) CHANNEL ASSIGNMENT METHOD FOR MULTI-FA CDMA CELLULAR SYSTEMS

(75) Inventors: Bong Yong Song, Seoul (KR); Jeong Chul Kim, Kyoungki-do (KR); Youl No Lee, Kyoungki-do (KR); Gab Seok Jang, Seoul (KR); Se Hyun Oh, Kyoungki-do (KR); Seong Jae Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 11/331,221

(22) Filed: Jan. 13, 2006

(65) Prior Publication Data

US 2006/0116144 A1    Jun. 1, 2006

Related U.S. Application Data

(62) Division of application No. 10/452,633, filed on Jun. 3, 2003, now Pat. No. 6,999,772.

(51) Int. Cl.
*H04Q 7/20* (2006.01)
*H04Q 7/00* (2006.01)
*H04B 7/216* (2006.01)

(52) U.S. Cl. .................. 455/450; 370/335; 370/331

(58) Field of Classification Search .............. 455/451, 455/452.1–452.2, 52, 63.1, 450, 445, 453, 455/63; 370/328, 331–333, 329, 335, 441, 370/320, 319, 450, 469, 341–349
See application file for complete search history.

(56) References Cited

U.S. PATENT DOCUMENTS

| | | | | |
|---|---|---|---|---|
| 5,093,927 A | * | 3/1992 | Shanley | ................. 455/513 |
| 5,203,012 A | | 4/1993 | Patsiokas et al. | |
| 5,361,258 A | * | 11/1994 | Arnold et al. | ............... 370/330 |
| 5,551,064 A | * | 8/1996 | Nobbe et al. | ................. 455/62 |
| 5,687,171 A | * | 11/1997 | Shin et al. | ................... 370/335 |
| 5,907,543 A | | 5/1999 | Jeon et al. | |
| 6,011,970 A | * | 1/2000 | McCarthy | ................... 455/436 |
| 6,032,045 A | * | 2/2000 | Mimura | ..................... 455/446 |
| 6,128,506 A | * | 10/2000 | Knutsson et al. | ........... 455/522 |
| 6,628,611 B1 | | 9/2003 | Mochizuki | |

* cited by examiner

*Primary Examiner*—Naghmeh Mehrpour
(74) *Attorney, Agent, or Firm*—Lowe Hauptman & Berner LLP

(57) ABSTRACT

A method for assigning a channel in multi-FA CDMA mobile communication system according to the received power prevents communication quality of a FA from being inferior to that of the others by managing the interference level of the FA. The method comprises the steps of: comparing a first threshold value with received power when the base station receives a new call request; assigning a traffic channel in a first FA of the request, if the received power is less than the first threshold value, and searching a second FA of which received power is least, if not; comparing a second threshold value with the received power of the second FA; and assigning a traffic channel in the second FA if the received power is less than the second threshold value, and rejecting the request, if not.

4 Claims, 4 Drawing Sheets

CHANNEL ASSIGNMENT METHOD FOR MULTI-FA CDMA CELLULAR SYSTEMS

This application is a divisional of U.S. patent application Ser. No. 10/452,633 filed Jun. 3, 2003 now U.S. Pat. No. 6,999,772.

BACKGROUND OF THE INVENTION

1. Technical Field of the Invention

The present invention relates to a channel assignment method, more particularly relates to a channel assignment method for multi-FA (Frequency Assignment) CDMA (Code Division Multiple Access) cellular systems, which enhances communication quality and enlarges capacity.

2. Description of the Prior Art

In general, CDMA systems may use a plurality of Frequency Assignments (FAs) at the same time. That is, the system is operated in multi-FA environment in which n FAs from FA1 to FAn (n is natural number) are used. FA used by each mobil station is selected according to a predetermined rule, for example, FA is selected by using HASH function in IS-95 (Interim Standard-95) CDMA cellular system.

Methods for assining channel to mobile station are largely divided into two techniques.

One is a method in which each base station manages FAs independently and a channel in only pre-selected FA is assigned to a mobile station. In this case, if a mobile station communicates through i_th (where, i is natural number) FA, FAi, though there is no useful channel in FAi, and there are some useful channels in another FA, FAj (where j is a natural number, $1 \leq j \leq n$, $j \neq i$), a channel in FAj is not assigned to the mobile station communicating through FAi.

The other is a method in which each base station totally manages all useful FAs. In this case, a traffic channel of another FA, FAj, different from a pre-selected FA, FAi, can be assigned to the mobile station when there is no useful traffic channel in the FAi, or the traffic channel of FAi is busier than that of the others.

FIG. 1 is a flowchart illustrating conventional channel assignment method. The method illustrated in FIG. 1 describes the former method.

A base station receives a channel assignment request from a mobile station of FAi and then determines whether the request is a handoff or a new call request at step 12. If the request is handoff call request and there is an available traffic channel in the FAi, the base station assigns the traffic channel at step 13. If the request is a new call request, the base station examines the number of occupied channels in FAi at step 14, and assigns a traffic channel only when the number of idle traffic channels which are not used is larger than that of reserved channels N_ho for handoff in FAi at step 15. The number of the reserved traffic channels for handoff is pre-determined. If the number of the idle traffic channel is less than or equal to that of the reserved channel for handoff, that base station rejects the call request at step 16.

FIG. 2 is a flowchart illustrating another conventional channel assignment method. The method illustrated in FIG. 2 describes the later method.

The base station receives a channel assignment request from a mobile station of FAi at step 21 and then determines whether the request is a handoff call request or a new call request at step 22. If the request is a handoff call request and there is a useful traffic channel in the FAi, the base station assigns the traffic channel at step 23. If the request is a new call request, the base station examines the number of occupied channels in FAi at step 24, and assigns a traffic channel only when the number of occupied traffic channels is less than a threshold N_th at step 25. Threshold N_th which is reference for transition of FA is set in a base station. If the number of the occupied traffic channels is equal to or larger than the threshold, the base station searches FAj ($1 \leq j \leq n$) of which the number of occupied traffic channel is less than that of the others at step 26, and assigns a traffic channel only when the number of idle traffic channels is larger than that N_ho of reserved channel for handoff in FAi at step 28. If the number of the idle traffic channel is less than or equal to that oN_ho f the reserved channel for handoff, the base station rejects the request at step 29.

In this case, it is possible to solve the unbalance problem of occupied traffic channel among a plurality of FAs in the base station.

However, in CDMA system, quality and capacity of communication is determined by the amount of interference signal. Accordingly, the number of occupied traffic channel can not be a proper reference for measuring quality of communication or amount of traffic. For example, even in the case that the number of occupied traffic channels of i_th FA, FAi, of a cell is less than that of j_th FA, FAj, if adjacent base stations of the cell experience traffic concentration in FAi, interference level of the FAi could be higher than that of the FAj.

Accordingly, there is a problem that communication quality of a FA is lower than that of the others by assigning a channel in the FA of which the number of occupied channel is less than that of the others but strength of interference signal in the FA is larger.

Therefore, a new channel assignment method is required for overcoming the problem.

SUMMARY OF THE INVENTION

Therefore, an object of the present invention is to provide a channel assignment method for multi-FA CDMA cellular systems which controls inter-FA traffic unbalance of base stations and improves communication quality.

According to an aspect of the present invention, this object is accomplished by providing a channel assignment method for multi-FA (Frequency Assignment) CDMA cellular systems in which a base station communicates a plurality of mobile stations, comprising the steps of: comparing a first threshold value with received power when the base station receives a new call requst; assigning a traffic channel in a first FA of the request, if the received power is less than the first threshold value, and searching a second FA of which received power is least, if not; comparing a second threshold value with received power of the second FA; and assigning a traffic channel in the second FA if the strength of received power is less than the second threshold value, and rejecting the request, if not.

According to another aspect of the present invention, this object is accomplished by providing a channel assignment method for multi-FA (Frequency Assignment) CDMA cellular systems in which a base station communicates a plurality of mobile stations, comprising the steps of: comparing a first threshold value with cell loading when the base station receives a new call request; assigning a traffic channel in a first FA of the request, if the cell loading is less than the first threshold value, and retrieving a second FA of which cell loading is least, if not; comparing a second threshold value with cell loading in the second FA; and assigning a traffic channel in the second FA, if the cell loading is less than the second threshold value, and rejecting the request, if not.

According to further another aspect of the present invention, this object is accomplished by providing a channel assignment method for multi-FA (Frequency Assignment) CDMA cellular systems in which a base station communicates a plurality of mobile stations, comprising the steps of: comparing a first threshold value with variance of received power when the base station receives a new call request; assigning a traffic channel in a first FA of the request, if the variance of received power is less than the first threshold value, and searching a second FA of which variance of received power is least, if not; comparing a second threshold value with the variance of received power; and assigning a traffic channel in the second FA if the variance of received power is less than the second threshold value, and rejecting the request, if riot.

According to still another aspect of the present invention, this object is accomplished by providing a channel assignment method for multi-FA (Frequency Assignment) CDMA cellular systems in which a base station communicates a plurality of mobile stations, comprising the steps of: comparing a first threshold value with standard deviation of received power when the base station receives a new call request; assigning a traffic channel in a first FA of the request, if the standard deviation of received power is less than the first threshold value, and searching a second FA of which standard deviation of received power is least, if not; comparing a second threshold value with standard deviation of received power; and assigning a traffic channel in a second FA if the standard deviation is less than the second threshold value, and rejecting the request, if not.

BRIEF DESCRIPTION OF THE DRAWINGS

Other objects and aspects of the invention will become apparent from the following description of the embodiments with reference to the accompanying drawings in which.

DETAILED DESCRIPTION OF THE PREFERRED EMBODIMENTS

The embodiments of the present invention will be described with reference to the accompanying drawings.

Figure 1:
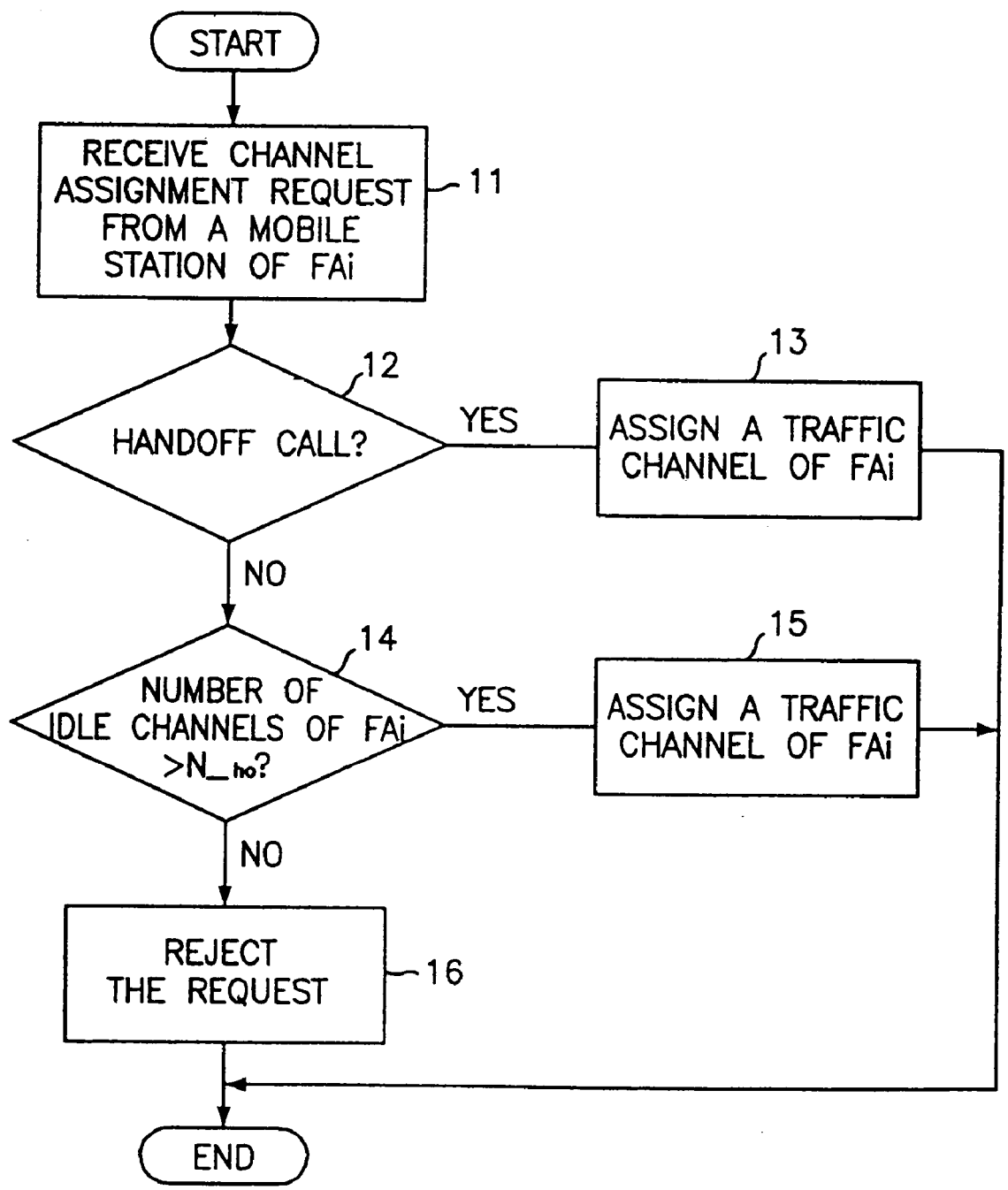
FIG. 1 is a flowchart illustrating a conventional channel assignment method.
Figure 2:
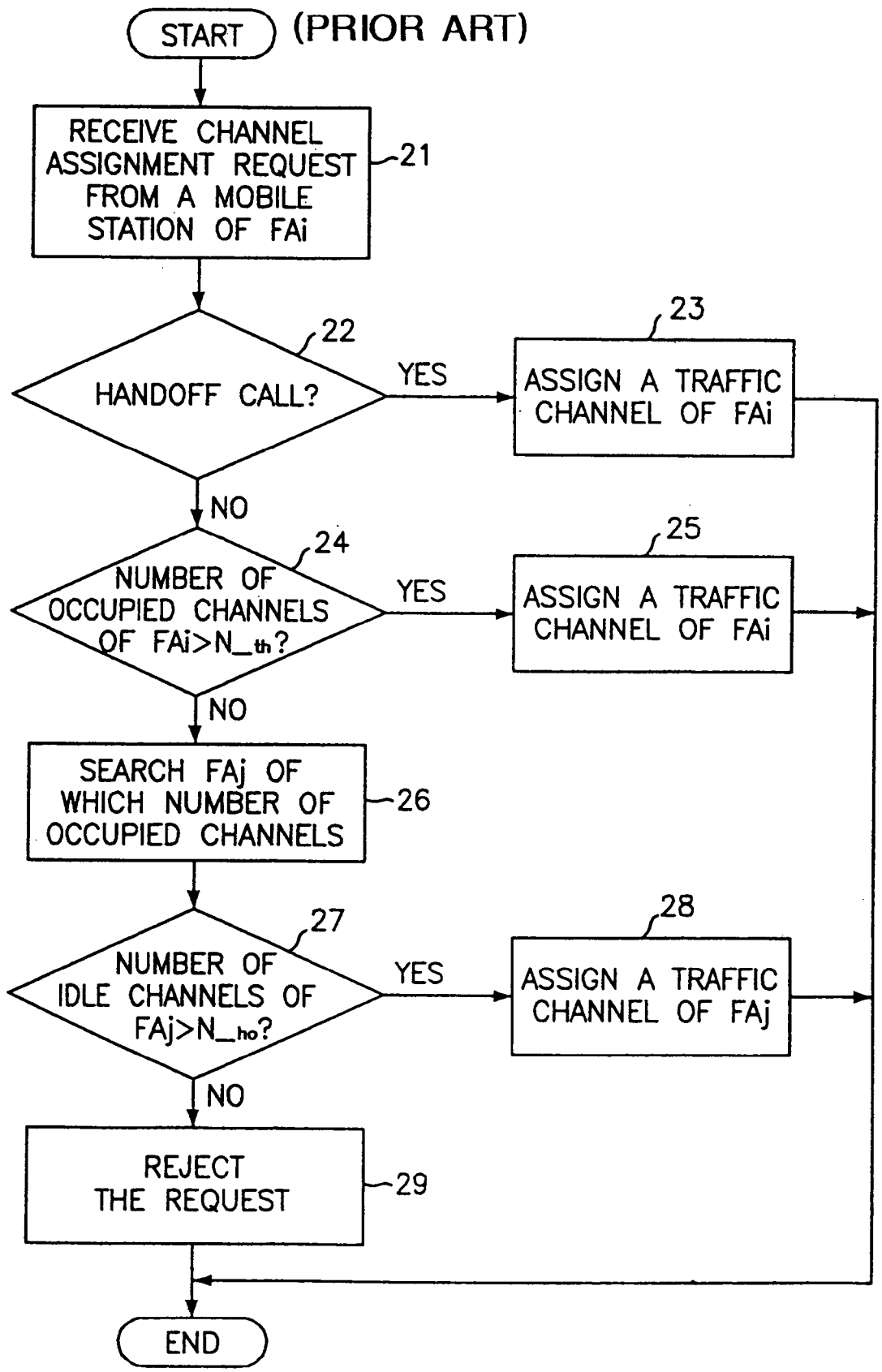
FIG. 2 is a flowchart illustrating another conventional channel assignment method.
Figure 3:
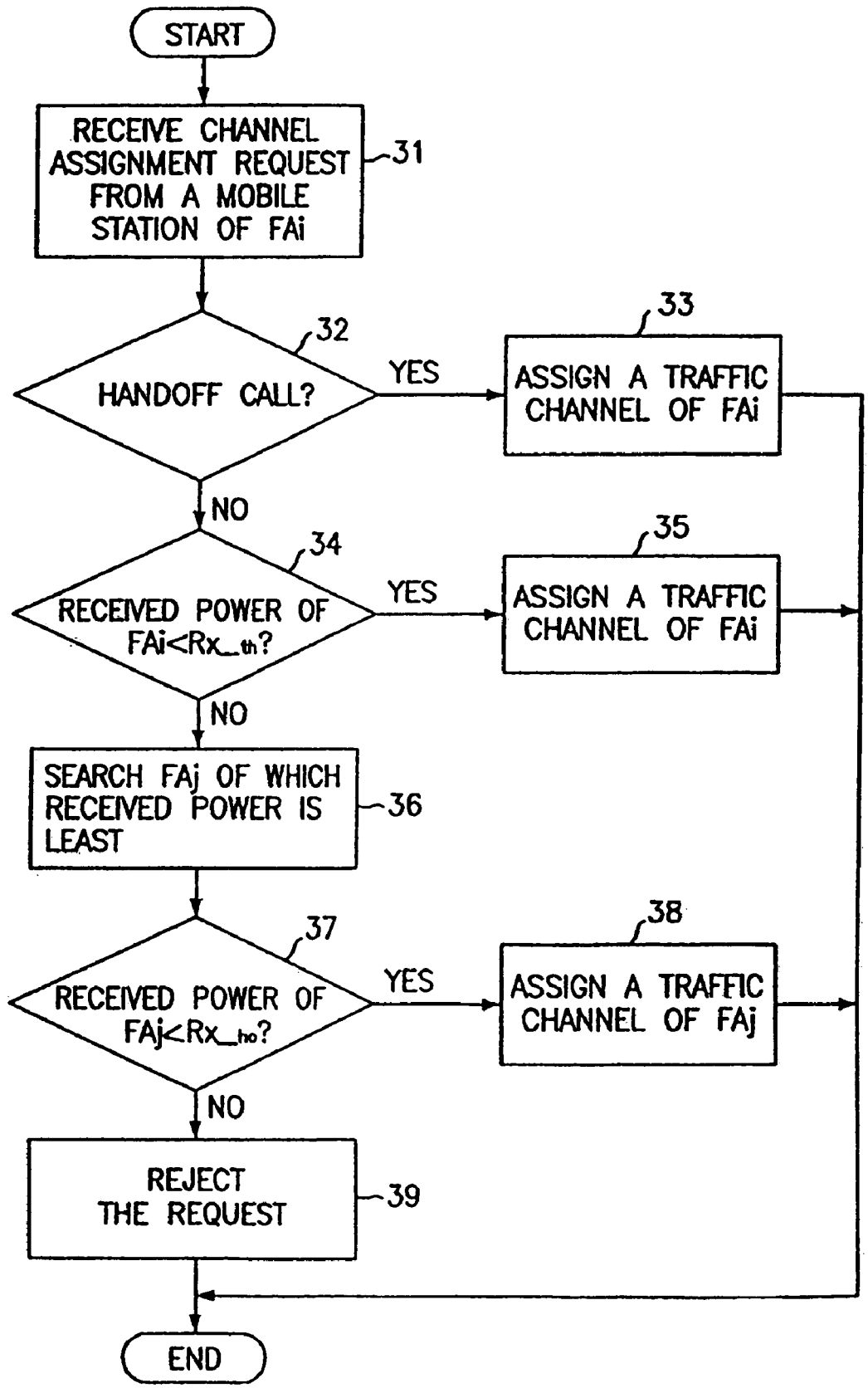
FIG. 3 is a flowchart illustrating channel assignment method in accordance with one embodiment of the present invention.

FIG. 3 is a flowchart illustrating channel assignment method in accordance with one embodiment of the present invention.

A base station has a threshold value Rx_th of received power which is used for determining transition of FAs. The base station receives channel assignment request from a mobile station of FAi at step 31, and determines whether the call is a handoff call or a new call at step 32. If the request is a handoff call request and there is an available traffic channel in the FAi, the base station assigns the traffic channel at step 33. If the request is a new call request, the base station determines whether the received power of FAi is larger or less than a first threshold Rx_th at step 34. If the received power of FAi is less than the first threshold Rx_th, the base station assigns a traffic channel in FAi to the mobile station demanding channel assignment. If not, the base station searches FAj ($1 \leq j \leq n$) of which the received power is less than that of the others at step 36. The base station determines whether strength of received power of FAj is larger or less than a second threshold Rx_ho at step 37. If the received power of FAj is less than the second threshold Rx_ho, base station assigns a traffic channel in FAj to the mobile station at step 38. If not, the base station rejects the request at step 39.

Figure 4:
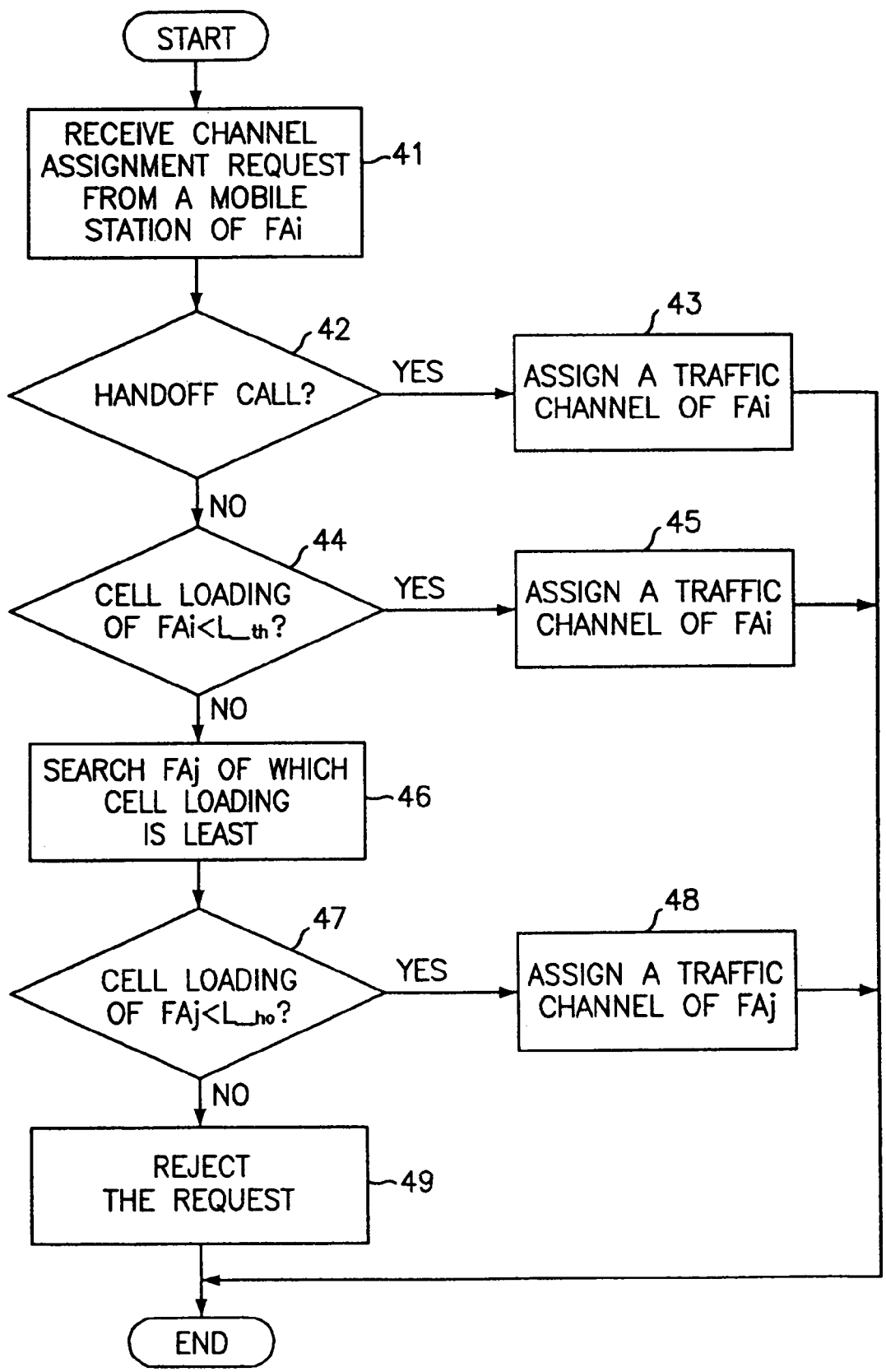
FIG. 4 is a flowchart illustrating channel assignment method in accordance with another embodiment of the present invention.

FIG. 4 is a flowchart illustrating channel assignment method in accordance with another embodiment of the present invention.

In this embodiment, there is a difference that cell loading is used as the reference used for determining channel assignment, and the others are the same with the first embodiment. The cell loading may be represented by equation (1) as follow:

$$\text{cell loading} = 1 - \text{thermal noise power}/\text{received power} \quad (1)$$

If the system is operating in a new capacity condition, the received power at the base station is far larger than that of the thermal noise power, and the cell loading is close to 1. On the contrary, if there are few users in a system, the received power at the base station is close to the thermal noise power, and the cell loading is close to 0.

A base station receives channel assignment request from a mobile station of FAi at step 41, and determines whether the request is a handoff call request or a new call request at step 42. If the request is a handoff call request and there is an available traffic channel in the FAi, the base station assigns a traffic channel at step 43. If the request is a new call request, the base station determines whether the cell loading of FAi is larger or less than the threshold at step 44. If the cell loading of FAi is less than the first threshold L_th, the base station assigns a traffic channel in FAi to the mobile station. If not, the base station searches FAj ($1 \leq j \leq n$) of which cell loading is less than that of the others at step 46. The base station determines whether cell loading of FAj is larger or less than a second threshold L_ho at step 47. If the cell loading of FAj is less than the second threshold L_ho, the base station assigns a traffic channel in FAj to the mobile station at step 48. If not, the base station rejects the request at step 49.

The key point of the present invention is to determine whether a channel is assigned or not, and which FA is selected, according to the received power at the base station. Therefore, it should be appreciated that the variance or the standard deviation of the received power at the base station can be used as a reference of channel assignment besides the received power or cell loading at the base station.

The channel assignment method according to the present invention prevents communication quality of a FA from being inferior to that of the others by managing the interference level of the FA. Management of the interference level is done based on the received power of the FA. The received power at the base station includes not only strength of power received from mobile stations communicating with itself but also that from mobile stations communicating with the other base stations and outside noise.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A channel assignment method for multi-FA (Frequency Assignment) CDMA cellular systems in which a base station communicates a plurality of mobile stations, comprising the steps of:
comparing a first threshold value with variance of received power when the base station receives a new call request;
assigning a traffic channel in a first FA of the request, if the variance of received power is less than the first threshold value, and searching a second FA of which variance of received power is least, if not;
comparing a second threshold value with the variance of received power; and
assigning a traffic channel in the second FA if the variance of received power is less than the second threshold value, and rejecting the request, if not.

2. The method as claimed in claim 1 further comprising the step of assigning a traffic channel in the first FA of the request, if there is an available channel in the first FA when a base station receives a handoff call request.

3. A channel assignment method for multi-FA (Frequency Assignment) CDMA cellular systems in which a base station communicates a plurality of mobile stations, comprising the steps of:
comparing a first threshold value with standard deviation of received power when the base station receives a new call request;
assigning a traffic channel in a first FA of the request, if the standard variance of received power is less than the first threshold value, and searching a second FA of which standard deviation of received power is least, if not;
comparing a second threshold value with standard deviation of received power; and
assigning a traffic channel in a second FA if the standard deviation is less than the second threshold value, and rejecting the request, if not.

4. The method as claimed in claim 3 further comprising the step of assigning a traffic channel in the first FA of the request, if there is an available channel when a base station receives a handoff call request.

* * * * *